(12) United States Patent
Louch

(10) Patent No.: US 10,078,414 B2
(45) Date of Patent: Sep. 18, 2018

(54) CURSOR FOR PRESENTING INFORMATION REGARDING TARGET

(75) Inventor: John Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 1470 days.

(21) Appl. No.: 11/693,604

(22) Filed: Mar. 29, 2007

(65) Prior Publication Data

US 2008/0244460 A1    Oct. 2, 2008

(51) Int. Cl.
*G06F 3/048* (2013.01)
*G06F 3/0481* (2013.01)
*G06F 9/451* (2018.01)

(52) U.S. Cl.
CPC .......... *G06F 3/04812* (2013.01); *G06F 9/453* (2018.02)

(58) Field of Classification Search
CPC ........ G06F 3/017; G06F 3/033; G06F 3/0482; G06F 2203/04805
USPC .................................................. 715/856, 861
See application file for complete search history.

(56) References Cited

U.S. PATENT DOCUMENTS

| | | |
|---|---|---|
| 4,661,810 A | 4/1987 | Himelstein et al. |
| 4,984,152 A | 1/1991 | Muller |
| 5,091,866 A | 2/1992 | Takagi |
| 5,146,212 A | 9/1992 | Venolia |
| 5,333,256 A | 7/1994 | Green et al. |
| 5,371,844 A | 12/1994 | Andrew et al. |
| 5,423,039 A | 6/1995 | Matteson |
| 5,448,695 A | 9/1995 | Douglas et al. |
| 5,461,710 A | 10/1995 | Bloomfield et al. |
| 5,479,602 A | 12/1995 | Baecker et al. |
| 5,495,604 A | 2/1996 | Harding et al. |
| 5,530,865 A | 6/1996 | Owens et al. |
| 5,570,281 A | 10/1996 | Berry |
| 5,572,641 A | 11/1996 | Kuo |
| 5,586,243 A | 12/1996 | Barber et al. |
| 5,596,694 A | 1/1997 | Capps |
| 5,687,331 A | 11/1997 | Volk et al. |
| 5,717,426 A | 2/1998 | Ohkado |
| 5,760,773 A | 6/1998 | Berman et al. |
| 5,777,615 A | 7/1998 | Barber et al. |
| 5,801,698 A | 9/1998 | Lection et al. |
| 5,850,218 A * | 12/1998 | LaJoie ............... H04N 5/44513 725/45 |
| 5,880,729 A | 3/1999 | Johnston, Jr. et al. |

(Continued)

OTHER PUBLICATIONS

Blenkhorn, P. et al., "Full-Screen Magnification for Windows Using DirectX Overlays," IEEE Transactions on Neural Systems and Rehabilitation Engineering, Dec. 2002, pp. 225-231, vol. 10, No. 4.

(Continued)

*Primary Examiner* — Daeho D Song
(74) *Attorney, Agent, or Firm* — Ronald Fernando

(57) ABSTRACT

In a graphical user interface, when a cursor is positioned over an icon or link associated with a target, the appearance of the cursor changes to present information describing or related to the target. Such information can include, for example, an excerpt of the contents of the target, and/or meta-data for the target, and/or an indication of what application or applications may be used to open the target. The information presented in the cursor can be shown in graphical form or in text form, or in a combination of both.

32 Claims, 8 Drawing Sheets

(56) References Cited

U.S. PATENT DOCUMENTS

| | | | |
|---|---|---|---|
| D407,698 S | 4/1999 | Alexiev | |
| 5,898,432 A | 4/1999 | Pinard | |
| 5,978,816 A | 11/1999 | Sakaguchi et al. | |
| 5,982,350 A | 11/1999 | Hekmatpour et al. | |
| 5,986,656 A | 11/1999 | Crutcher et al. | |
| 5,995,079 A | 11/1999 | Sheasby et al. | |
| 6,016,146 A | 1/2000 | Beer et al. | |
| D425,497 S | 5/2000 | Eisenberg et al. | |
| 6,067,085 A | 5/2000 | Modh et al. | |
| 6,097,390 A | 8/2000 | Marks | |
| 6,100,871 A | 8/2000 | Min | |
| 6,112,214 A | 8/2000 | Graham et al. | |
| 6,140,996 A | 10/2000 | Nobutani et al. | |
| 6,208,376 B1 | 3/2001 | Tanaka et al. | |
| 6,353,452 B1 | 3/2002 | Hamada et al. | |
| 6,356,908 B1* | 3/2002 | Brown | G06F 17/30899 |
| 6,366,299 B1 | 4/2002 | Lanning et al. | |
| 6,468,085 B1 | 10/2002 | Bergan et al. | |
| 6,507,349 B1 | 1/2003 | Balassanian | |
| 6,572,660 B1* | 6/2003 | Okamoto | G06F 17/30014 707/E17.013 |
| 6,606,101 B1 | 8/2003 | Malamud et al. | |
| D487,275 S | 3/2004 | Ording et al. | |
| 6,809,720 B2 | 10/2004 | Malamud et al. | |
| 6,865,719 B1* | 3/2005 | Nicholas, III | 715/856 |
| 6,883,145 B2 | 4/2005 | Jaeger | |
| D506,208 S | 6/2005 | Jewitt et al. | |
| 6,917,373 B2 | 7/2005 | Vong et al. | |
| D508,248 S | 8/2005 | Ording | |
| 6,948,126 B2 | 9/2005 | Malamud et al. | |
| 7,027,052 B1* | 4/2006 | Thorn | G06T 11/206 345/440 |
| D521,017 S | 5/2006 | Jewitt et al. | |
| D525,265 S | 7/2006 | Rozier | |
| 7,089,256 B2 | 8/2006 | Smialek | |
| 7,103,851 B1* | 9/2006 | Jaeger | 715/786 |
| 7,155,489 B1* | 12/2006 | Heilbron | G06F 17/30905 709/217 |
| 7,240,300 B2 | 7/2007 | Jaeger | |
| 7,260,781 B2* | 8/2007 | DeMello | G06F 3/0481 715/711 |
| 7,296,230 B2* | 11/2007 | Fukatsu | G06F 17/30873 707/E17.111 |
| D563,978 S | 3/2008 | Leute et al. | |
| D563,979 S | 3/2008 | Viegers et al. | |
| 7,353,246 B1* | 4/2008 | Rosen | G06F 17/30855 707/999.01 |
| 7,441,233 B1 | 10/2008 | Orndorff et al. | |
| 7,519,469 B2* | 4/2009 | de Silva | G01C 21/36 340/995.17 |
| 7,549,132 B2 | 6/2009 | Petri | |
| 7,554,521 B1 | 6/2009 | Migos et al. | |
| 7,594,168 B2 | 9/2009 | Rempell | |
| 7,665,028 B2* | 2/2010 | Cummins | G06F 3/0486 715/769 |
| 7,765,486 B2 | 7/2010 | Jaeger | |
| 2002/0075199 A1 | 6/2002 | Asahi et al. | |
| 2002/0109737 A1 | 8/2002 | Jaeger | |
| 2003/0142123 A1* | 7/2003 | Malamud et al. | 345/715 |
| 2003/0145281 A1* | 7/2003 | Thames | G06F 8/71 715/205 |
| 2003/0162569 A1 | 8/2003 | Arakawa et al. | |
| 2004/0056904 A1 | 3/2004 | Jaeger | |
| 2004/0205514 A1* | 10/2004 | Sommerer | G06F 17/212 715/205 |
| 2004/0205633 A1* | 10/2004 | Martinez | G06F 17/30899 715/274 |
| 2005/0034080 A1 | 2/2005 | Jaeger | |
| 2005/0071772 A1 | 3/2005 | Jaeger | |
| 2005/0091609 A1* | 4/2005 | Matthews | G06F 3/0482 715/804 |
| 2005/0114778 A1* | 5/2005 | Branson | G06F 9/453 715/711 |
| 2005/0183027 A1 | 8/2005 | Jaeger | |
| 2005/0190147 A1 | 9/2005 | Kim | |
| 2006/0069617 A1* | 3/2006 | Milener et al. | 705/14 |
| 2006/0101341 A1* | 5/2006 | Kelly | G06F 17/30899 715/738 |
| 2006/0132460 A1 | 6/2006 | Kolmykov-Zotov et al. | |
| 2006/0221082 A1 | 10/2006 | Rifkin | |
| 2006/0244638 A1* | 11/2006 | Lettau | G01C 21/367 340/995.1 |
| 2006/0247855 A1* | 11/2006 | de Silva | G01C 21/36 701/454 |
| 2007/0094614 A1* | 4/2007 | Kawamoto | G06F 3/04812 715/822 |
| 2007/0106956 A1* | 5/2007 | Platt | G06F 17/30905 715/808 |
| 2007/0180381 A1* | 8/2007 | Rice | G06F 17/30905 715/711 |
| 2007/0247435 A1* | 10/2007 | Benko | G06F 3/0488 345/173 |
| 2007/0268317 A1* | 11/2007 | Banay | G06F 3/0481 345/660 |
| 2007/0300164 A1* | 12/2007 | Bhogal | G06F 3/04817 715/753 |
| 2008/0034329 A1* | 2/2008 | Posner | G06Q 30/02 715/856 |
| 2008/0040683 A1* | 2/2008 | Walsh | G06F 3/04855 715/786 |
| 2008/0068335 A1 | 3/2008 | Arakawa et al. | |
| 2008/0091689 A1* | 4/2008 | Mansikkaniemi | G01C 21/3682 |
| 2008/0104526 A1 | 5/2008 | Jaeger | |
| 2008/0104527 A1 | 5/2008 | Jaeger | |
| 2008/0104571 A1 | 5/2008 | Jaeger | |

OTHER PUBLICATIONS

Bolt, R.A., "Human Interfaces for Managers," Computerworld in Depth, Jul. 16, 1984, pp. 1-18.

Herot et al., "A Prototype Spatial Data Management System," Computer Graphics Quarterly Report of SIGGRAPH-ACM, Jul. 1980, pp. 63-70.

Livingston, B. et al., "Windows 95 Secrets," 1995, IDG Books Worldwide, Inc., Third Edition, pp. 612-615.

Research Disclosure, "Animated Icons," Sep. 1989, p. 654.

Sagman, "Microsoft Office XP ® for Windows: Visual QuickStart Guide," Peachpit Press, Chapter 2, Level 1, Section 4.

Simpson, A., "Windows 95 Uncut," 1995, IDG Books Worldwide, pp. 31, 32, 57, 115, 134, 137, 138, 139, 246.

USPTO Office Action dated Apr. 1, 2008 from U.S. Appl. No. 10/690,611.

* cited by examiner

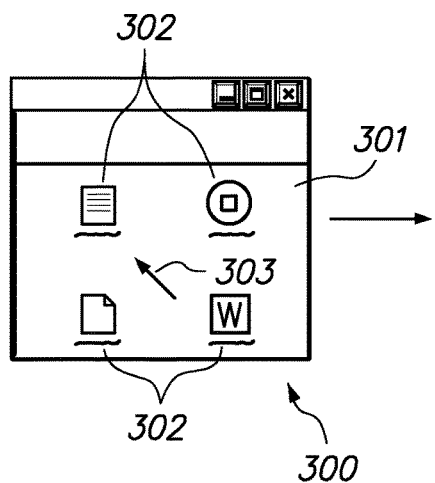
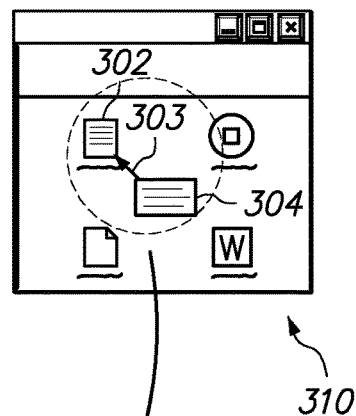
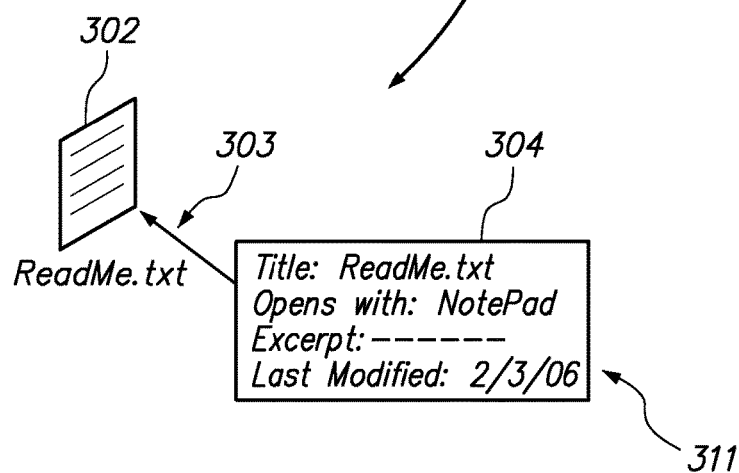
FIG. 3A
FIG. 3B
FIG. 3C

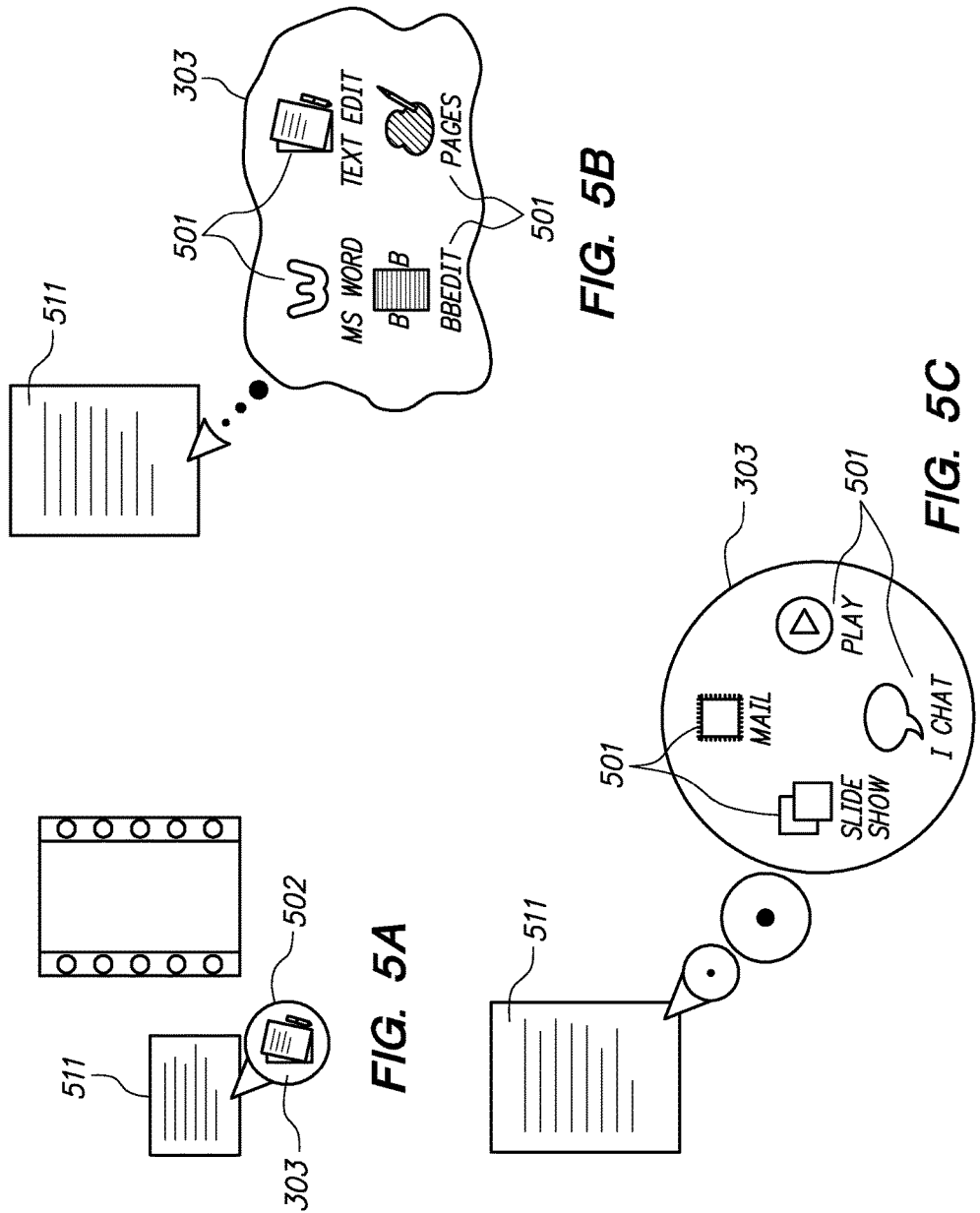

CURSOR FOR PRESENTING INFORMATION REGARDING TARGET

CROSS-REFERENCE TO RELATED APPLICATION

The present application is related to pending U.S. patent application Ser. No. 10/690,611, for Dynamically Changing Cursor for User Interface, filed Oct. 23, 2003, the disclosure of which is incorporated herein by reference.

FIELD OF THE INVENTION

The present invention relates generally to presenting information within a cursor, and more particularly to techniques for presenting information, within a cursor, about a target represented by an on-screen element.

BACKGROUND OF THE INVENTION

Most graphical user interfaces (UIs) use an on-screen cursor that can be controlled by the user to point to various UI elements on a display screen. Some of these UI elements are user-activatable elements such as icons or links that provide access to other resources such as documents, web pages, applications, and the like. The resource or item that is referenced by an icon or link is referred to as a target.

Depending on the particular operating system and context, the target can be opened or launched by activating the user-activatable element. Activation of the user-activatable element can take place in various ways. For example, the user can position the cursor so that it is on top of the user-activatable element, and then can click, double-click, or right-click a user input device (such as a mouse, keyboard, or the like). In some operating systems, different actions take place depending on the nature of the user input; for example, double-clicking may cause the target to open, while right-clicking may cause a menu to appear that gives the user a number of options as to how the target should be opened. Such operations are familiar to users and are employed in many different contexts in today's user interfaces.

It is often useful for a user to be given an indication as to the content of the target, before the user clicks on the user-activatable element that will open the target. However, in many cases, the text or icon normally associated with a user-activatable element is insufficient to provide a user with enough information to determine whether the target is of interest. Often, the text or icon normally associated with a user-activatable element provides minimal information as to a) the content of the target; and b) what applications might be available to open the target.

It is known to change the appearance of the on-screen cursor to indicate a current mode or type of functionality that is available with respect to a particular area of the screen. For example, when the on-screen cursor is positioned in a text entry field, the cursor may change to a text entry cursor (vertical bar); when the cursor is positioned over a movable object, the cursor may change to a hand or arrow. In this manner, the user is given some information as to the type of input operation that can be performed.

In addition, it is known to change the appearance of the on-screen cursor to indicate a current state of the system. For example, when the system is busy, the cursor may change to an hourglass so as to inform the user of the current state.

However, such limited information generally fails to provide useful information about a target item referenced by a user-activatable element. In particular, current user interfaces do not generally provide any technique for providing detailed information about a target within a cursor in a manner that is responsive and dynamically controllable by the user.

What is needed, therefore, is a system and method for providing information about a target before the user activates the icon or link that will open the target. What is further needed is a system and method for providing information about what applications might be available to open or access the target before the user activates the item, such as an icon or link that will open the target. What is further needed is a system and method for providing such information in an unobtrusive manner that does not interfere with normal interaction with the user interface. What is needed is a system and method for displaying information about a target by changing the appearance of an on-screen cursor.

SUMMARY OF THE INVENTION

According to the present invention, responsive to the user positioning a cursor over an icon or link associated with a target, the cursor is changed so that it displays information describing or related to the target.

In one embodiment, the information presented in the cursor includes an excerpt of the contents of the target, where the target is a file, web page, or other item associated with content. In another embodiment, the information presented in the cursor includes an indication as to what application will be launched by default if the user activates the icon or link, or what other applications might be available to open the target. In yet another embodiment, the information presented by the cursor includes meta-data, summary, or other descriptive information concerning the target.

The information presented in the cursor can be shown in graphical form or in text form, or in a combination of both.

BRIEF DESCRIPTION OF THE DRAWINGS

The accompanying drawings illustrate several embodiments of the invention and, together with the description, serve to explain the principles of the invention.

FIGS. 3A and 3B are screen shots depicting an example of a cursor including information regarding a target document in a file manager application.

FIG. 3C is an enlargement of a detail of FIG. 3B.

FIGS. 4A through 4D are screen shots depicting an example of a cursor that changes in appearance as it is moved from one link to another in a browser application, so as to include information regarding a target of the link.

FIGS. 5A through 5C depict further examples of a cursor that changes in appearance, so as to provide information regarding a target.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

The various features of the invention as described herein include output presented on a display screen that is connected to the personal computer. In addition, the invention makes use of input provided to the computer system via input devices such as a keyboard, mouse, touchpad, or the like. Such hardware components, including their operation and interactions with one another and with a central processing unit of the personal computer, are well known in the art of computer systems and therefore are not depicted here.

In the following description, the invention is set forth with respect to displaying information in connection with an icon or link. One skilled in the art will recognize that such description is merely illustrative, and that the invention can operation in connection with other types of on-screen elements, not limited to icons and links.

Hardware Architecture

In one embodiment, the present invention is implemented in a conventional personal computer system, such as an iMac, Power Mac, or Power-Book, (available from Apple Computer, Inc. of Cupertino, Calif.), running an operating system such as MacOS X (also available from Apple Computer, Inc.). It will be recognized that the invention may be implemented on other devices as well, such as handhelds, personal digital assistants (PDAs), mobile telephones, consumer electronics devices, and the like. The invention may be embodied in software that runs on the personal computer. The invention may be included as add-on software, or it may form part of the operating system itself, or it may be a feature of an application that is bundled with the computer system or sold separately.

Figure 1:
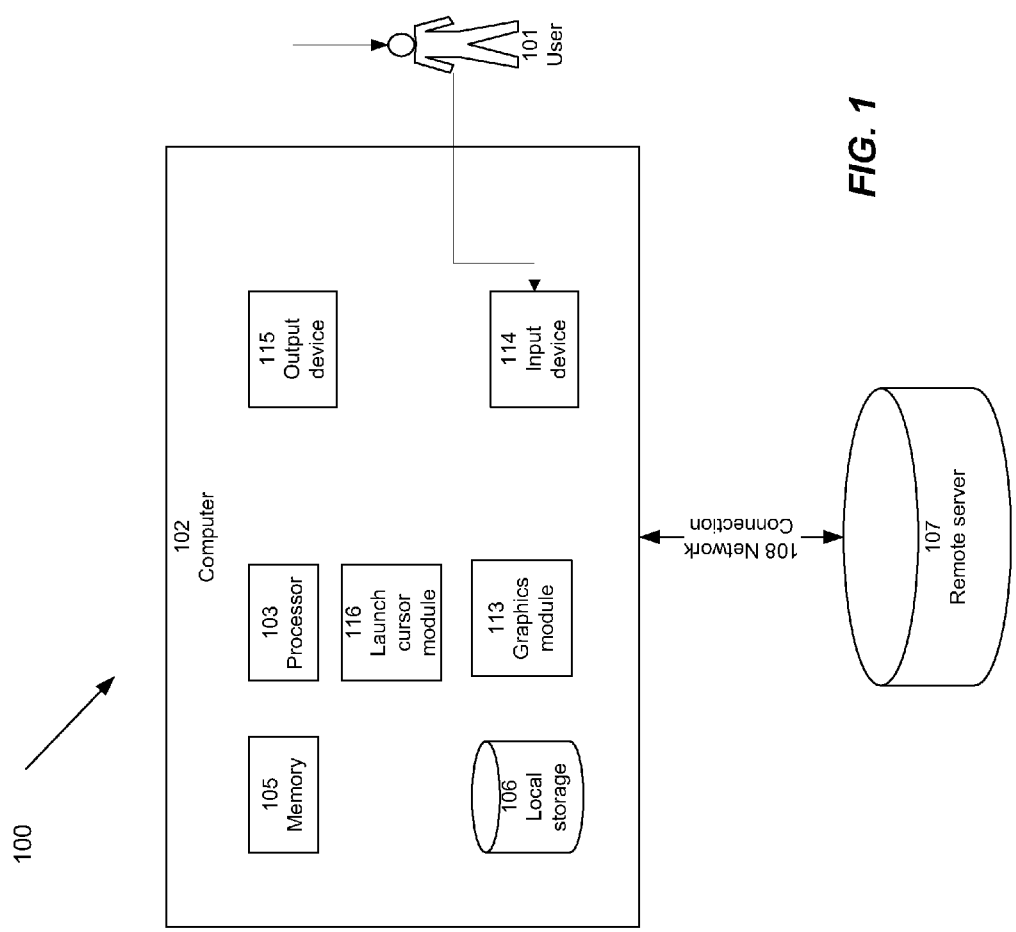
FIG. 1 is a block diagram depicting an architecture for implementing the invention according to one embodiment.

One example of an implementation of the present invention is in a Macintosh personal computer running the MacOS X operating system. Referring now to FIG. 1, there is shown an example of an architecture for a system 100 for implementing the present invention. Personal computer 102 includes processor 103, memory 105, input devices 114 such as keyboard and mouse, and output device 115 such as a display screen. A graphics module 113, such as a graphics card, may be provided for generating output for output device 115. User 101 interacts with system 100 by providing input via device 114 and viewing output via device 115. Several Figures are presented as screen shots depicting examples of the user interface as it might appear on a display screen or other output device 115. Computer 102 also includes local storage 106, such as a hard drive, and can also include network connection 108 for accessing remote server 107. These components are well-known hardware components commonly used for running software applications. In one embodiment, software embodying the invention is provided on a computer-readable medium such as local storage 106.

In another embodiment, the present invention is implemented as a plug-in, indicated in FIG. 1 as launch cursor module 116, that can be installed and run on personal computer 102, and that interacts with the operating system of personal computer 102 to perform the functions described herein. In yet another embodiment, the present invention is implemented as functionality in a software application running on a personal computer.

For illustrative purposes, in the following description the invention is described as a feature of an operating system; however, one skilled in the art will recognize that the techniques of the present invention can be implemented in other contexts as well, including those described above.

Method of Operation

Figure 2:
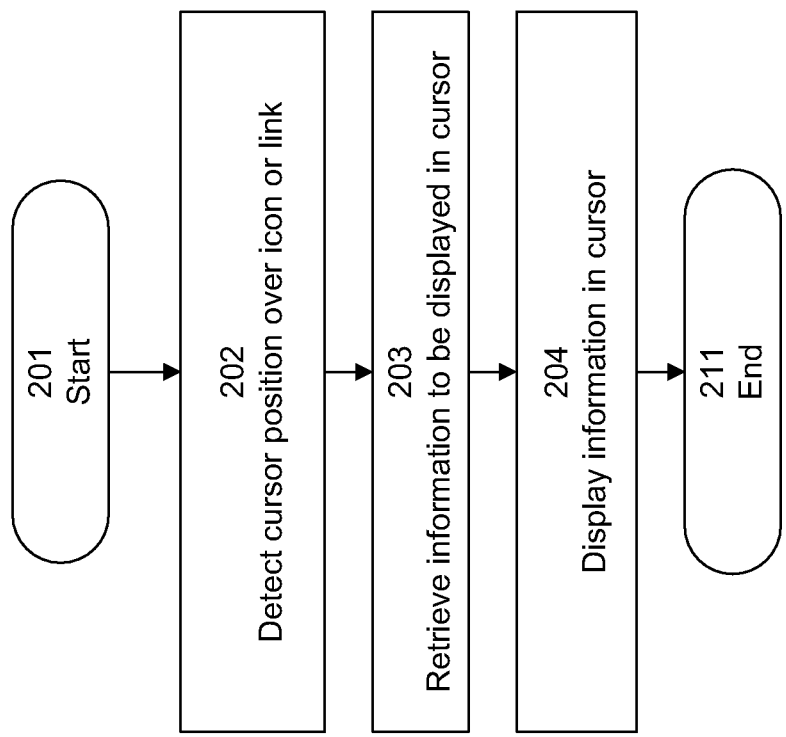
FIG. 2 is a flow diagram depicting a method for practicing the present invention according to one embodiment.

Referring now to FIG. 2, there is shown a flowchart depicting a method for presenting, in a cursor, information regarding a target.

The positioning of a cursor over an icon, link, or other user-activatable element is detected 202. In response, information is retrieved 203 and displayed 204 in the cursor. In one embodiment, the information is retrieved 203 from a database containing pre-fetched information about various activatable elements on the screen. In another embodiment, the information is retrieved 203 on-the-fly by accessing data directly from the target item associated with the activatable element. If appropriate, the information is scaled or otherwise modified so that it is suitable for display within the cursor. In one embodiment, a data format is established for storing such information at a desired level of detail. A set of tag data is made available for retrieval. Depending on what level of control is available with regard to the underlying application, different types of data can be made available for display within the cursor.

The displayed information can be image-based, text-based, or a combination of both. The displayed information can also include animation, video, or the like.

The information is displayed in the cursor by changing the appearance of the cursor to incorporate the retrieved information. For example, the cursor can be enlarged to include an area where the information can be displayed. Alternatively, the cursor can remain the same size but can contain additional text and/or graphics representing information about the target. Those portions of the cursor other than the information about the target can remain the same as before or can change when the information is displayed. Alternatively, the information can be presented alongside or partially overlapping the original form of the cursor. In one embodiment, the information can be positioned at different locations with respect to cursor, depending on user preferences or system parameters. For example, information may be displayed to the right of the cursor, but may move to the left of the cursor when the cursor is near the right edge of the screen.

The user can continue to move the cursor, in which case the displayed information moves along with the rest of the cursor. In one embodiment, if the user moves the cursor so that it is no longer positioned over the link or icon, the displayed information is dismissed and the cursor is restored to its normal state. In another embodiment, the information is not dismissed until the user indicates that he or she would like it to be dismissed, for example by clicking a button or hitting a key. In yet another embodiment, the information is dismissed after the cursor has been moved away from the icon or link for some pre-specified period of time.

In one embodiment, before the steps of the method of FIG. 2 are performed, the information to be displayed within the cursor may be pre-fetched so that it can be retrieved and displayed more quickly. In particular, in an embodiment where the information is retrieved from a remote source, the information can be obtained from the remote source before it is needed for display in a cursor. For example, in a web browser where a web page containing links is displayed, information for targets associated with the links is pre-fetched; then, when the user causes the cursor to pass over one of the links, the pre-fetched information can be displayed within the cursor. In another embodiment, in anticipation of a possible need for information for display in a cursor, the system can copy information from a storage device to a cache that is capable of faster response when information is requested.

In one embodiment, the cursor is only changed if the user causes the cursor to "hover" over the icon or link for a predetermined length of time such as, for example 0.5 seconds. Thus, if the user merely passes over one or more icons or links on the way to another on-screen location, the cursor does not change repeatedly, which could be distracting.

Any type of information can be presented in the cursor. The following is a list of examples illustrating the information that can be presented with respect to a target:

- Metadata describing the target (Author, size, date created, date modified, length, read/write permissions, security, location, and the like)
- Excerpt of text or other content from target
- Thumbnail of image and/or text from target, or portion thereof.
- Web page relating to target
- Applications that can be used for opening target
- Access limitations and settings for target
- Comments/annotations submitted by other users concerning target
- Virus warnings concerning target
- Estimated time to retrieve and/or download target In one embodiment, the cursor includes a clear indication of the hotspot (that specific location within the cursor that is sensitive to selection or that determines what underlying element will be selected if the cursor is activated). For example, the cursor might include an arrow in addition to the information presented within the cursor, where the tip of the arrow indicates the hotspot of the cursor. The hotspot may be shown explicitly with an animation or prominent visual feature. In other embodiments, the hotspot is not explicitly pointed out visually, but a visual feature such as background color changes to indicate whether or not the hotspot is over a particular element or region of the screen. In yet other embodiments, the hotspot is not shown while information is being displayed in the cursor.

Examples and Variations

Referring now to FIGS. 3A through 3C, there are shown screen shots 300, 310 and a detail 311 of screen shot 310, depicting operation of the present invention according to one embodiment.

FIG. 3A depicts an on-screen window 301 as might be displayed in a graphical user interface according to well-known techniques. Icons 302 are shown within window 301. As is known in the art, each icon 302 represents a document, file, web page, link, or other activatable item. The user moves cursor 303 around window 301 using a mouse or other pointing device (not shown). The user can select and/or activate an icon 302, for example by clicking or double-clicking on icon 302. Selecting an icon 302 may cause the icon 302 to be highlighted so that further action can be taken on it. Activating an icon 302 causes the target identified by the icon 302 to be launched, opened, or activated. Although such techniques are standard and well-known in the art, one skilled in the art will recognize that the present invention can be implemented in alternative embodiments where other techniques are used.

FIG. 3B depicts on-screen window 301 after the user has moved cursor 303 so that it is hovering over one of icons 302. In accordance with the techniques of the present invention, the appearance of cursor 303 changes so as to include useful information about the target represented by icon 302. FIG. 3C is a detail 311 of screen shot 310, showing cursor 303 including information 304 describing a document represented by icon 302, entitled "ReadMe.txt". The information 304 shown in FIG. 3C includes title of the document, the name of application that was used to create the document, the last-modified date, and an excerpt of the text in the document. However, one skilled in the art will recognize that any information can be shown in cursor 303. In one embodiment, the user can specify what type of information is shown in cursor 303. As described above, cursor 303 also includes an arrow so that the hotspot of cursor 303 can be readily identified as being the tip of the arrow.

In one embodiment, the user can continue to move cursor 303 while its appearance includes the additional information 304. Cursor 303 reverts to its original appearance (a simple arrow) if and when the user moves cursor 303 so that it no longer points to icon 302. In one embodiment, any changes to cursor 303 take effect only after some period of time has elapsed after cursor 303 has been moved onto or off of an icon 302. Introduction of such a delay (such as, for example, a half-second) can avoid the undesirable and distracting effect of having cursor 303 change in appearance several times in rapid succession as the user moves cursor 303 across several icons 302 and other areas of window 301.

Figure 4A:
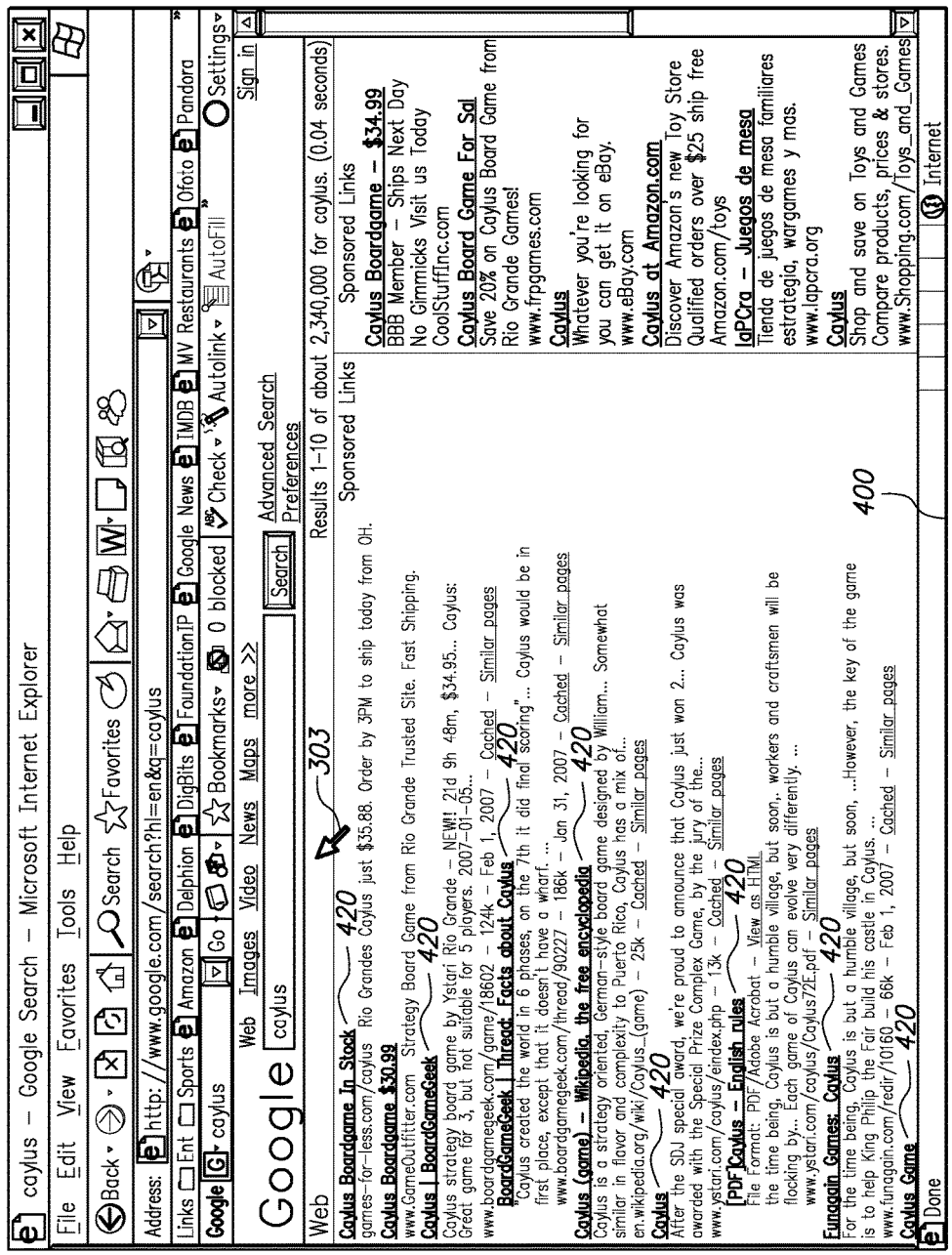
Figure 4B:
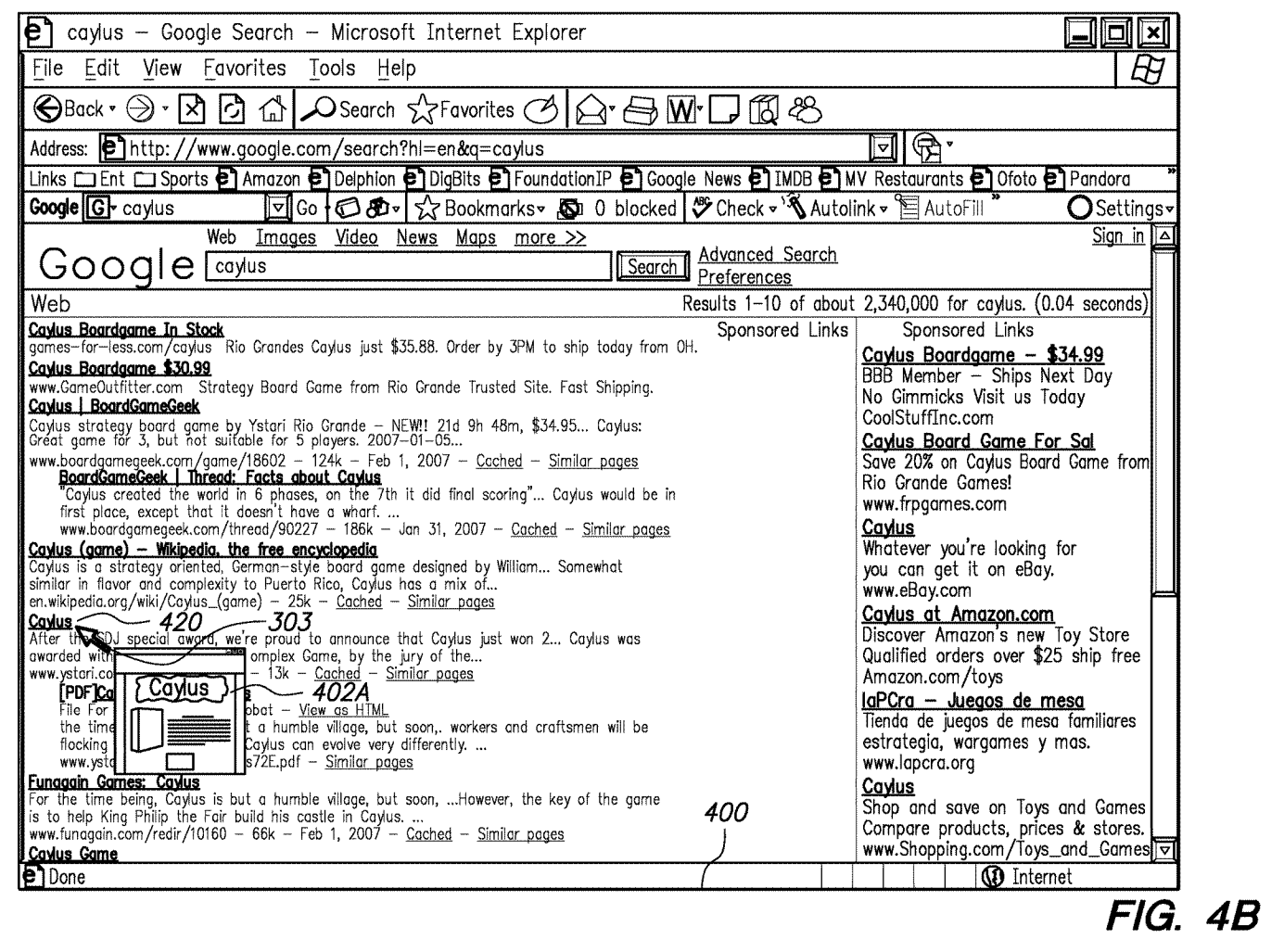

FIGS. 4A through 4D depict another example of the operation of the present invention. Here, the appearance of cursor 303 changes in response to the movement of cursor 303 to point to various links 420 in a web page 400. In FIG. 4A, cursor 303 has its original appearance, as it is not pointing to any link 420. In FIG. 4B, the user has moved cursor 303 to point to an on-screen link 420; as a result, the appearance of cursor 303 has changed so that it shows a thumbnail image 402A representing a website associated with the link 420 to which cursor 303 is pointing. Again, one skilled in the art will recognize that other information can be presented in cursor 303, instead of or in addition to thumbnail image 402A.

Figure 4C:
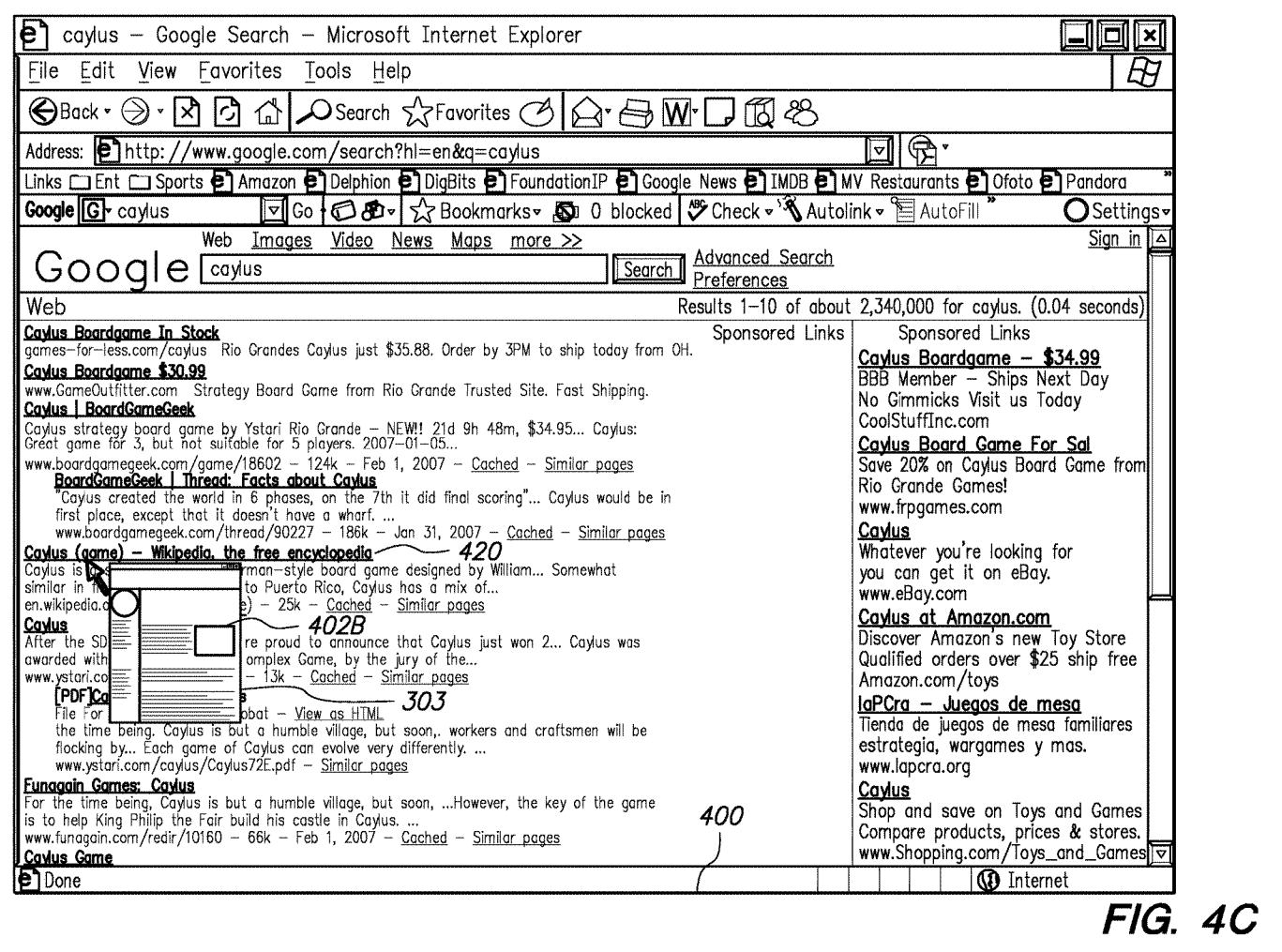

In FIG. 4C, the user has moved cursor 303 to point to a different on-screen link 420; again, cursor 303 changes to show a thumbnail image 402B representing a website associated with the link 420 to which cursor 303 is pointing.

In one embodiment, the techniques exemplified in FIGS. 4A through 4C are implemented by pre-fetching thumbnail images 402A for all links on a web page. Such pre-fetching can be performed, for example, upon initial loading of web page 400. In one embodiment, the pre-fetched thumbnail images 402A can be locally cached so that they are readily available upon future visits to the same web page 400.

Figure 4D:
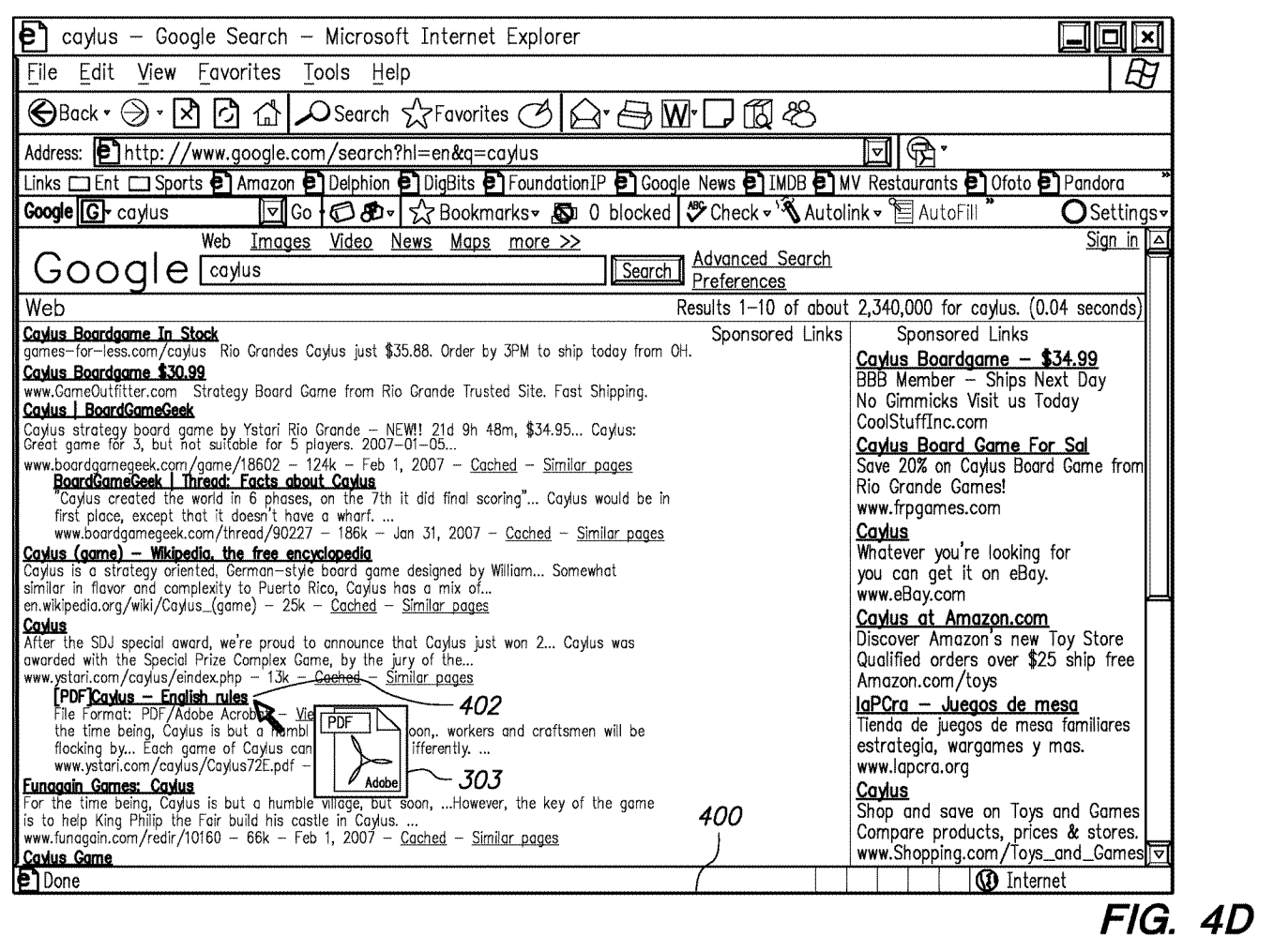

FIG. 4D depicts an example where cursor 303 changes in appearance to include an icon representing the type of document associated with link 402. Specifically, in this example, link 402 points to a PDF file; therefore, cursor 303 changes in appearance to include a PDF icon. In one embodiment, such an icon may be included in cursor 303 when a thumbnail image is not available or cannot be read quickly enough to provide satisfactory response time when the user moves cursor 303 over a link 420.

FIGS. 5A through 5C depict additional examples of operation of the present invention according to various embodiments. In FIG. 5A, cursor 303 has been moved so that it hovers over icon 511; as a result, the appearance of cursor 303 is changed to include artwork 502 providing useful information about the item represented by icon 511.

FIG. 5B depicts a close-up view of cursor 303 which points to icon 511. Here, cursor 303 includes representations of four applications that can be used for opening a document associated with icon 511. Thus, the present invention can be used to let the user know what applications can be used to open a document.

FIG. 5C depicts a close-up view of cursor 303 which points to another icon 511. Again, cursor 303 includes representations of four actions that can be taken with respect to a document associated with icon 511.

In embodiments such as those exemplified by FIGS. 5B and 5C, cursor 303 depicts several options for interacting with icon 511. For example, several different applications and/or actions can be initiated to interact with the document represented by icon 511. Accordingly, in such embodiments, a mechanism may be made available for selecting one of the options represented in cursor 303. For example, a mechanism may be made available to allow a user to select one of the applications or actions for interacting with icon 511. A keyboard or other input device may be used to select among the available options. Alternatively, a user clicks once to indicate that he or she wishes to open the item, and then a portion of the cursor detaches so that it can be moved among the options to select an application that will be used to open the item. Alternatively, a default option can be used if the user clicks, while other options can be made available if the user clicks while a modifier key is pressed; again, the user can select among the other options via a keyboard or other input device, or detached portion of the cursor.

In one embodiment, cursor 303 does not change appearance automatically when the user causes it to hover over a user-activatable element, but only changes in response to a modifier key or other command being executed. Thus, the user can indicate when he or she would like to see the additional information in cursor 303. In one embodiment, the additional information only remains in cursor 303 as long as the modifier key or other key is held down; in another embodiment the modifier key or other key acts as a toggle to change the appearance of cursor 303 back and forth between its original appearance and the modified appearance including the additional information. In yet another embodiment, a command is made available to change cursor 303 to provide different types of information about the target; for example, cursor 303 might first show an excerpt of the content of the target, but might change in response to a user command to show meta-data about the target A keystroke might be used to cycle among various types or instances of information shown within cursor 303, and back to cursor's 303 original appearance.

In one embodiment, cursor 303 shows a subset of available information about the target, with an indication that further information is available. The user can scroll, for example using arrow keys, to see other subsets of available information. Alternatively, the information in the cursor 303 can automatically scroll, for example as a scrolling banner in a horizontal and/or vertical direction, so as to show more information to the user than would otherwise be available in a limited space as afforded by the size of the cursor 303. In one embodiment, the user can stop or start the scrolling with a command such as a button-click or keystroke.

In another embodiment, the user can activate a command to enlarge cursor 303 temporarily to see more information about the target. A keyboard command can be used to initiate such enlargement and another command can be used to restore the original appearance of cursor 303. Alternatively, a single command can be used to toggle between the two states.

In one embodiment, the appearance of cursor 303 includes an indication of the current state of an application. For example, if cursor 303 is pointing to an icon associated with an application, cursor 303 may change to show that the application is currently open, or in the process of being launched, or unavailable, or not currently open, or the like. In this manner, the present invention is able to operate in connection with a dynamically changing cursor as described in related U.S. patent application Ser. No. 10/690,611.

In one embodiment, cursor 303 is presented as a "hybrid" cursor as described in related U.S. patent application Ser. No. 10/690,611, where a conventional portion includes a pointer arrow and a tail portion provides information about the target. An example of the use of a hybrid cursor to provide information about the target is shown in FIG. 3C, where an arrow forms part of cursor 304, and a box containing useful information about the target forms another part of cursor 304. In most of the examples presented herein, a hybrid arrangement is used, although one skilled in the art will recognize that such a technique is by no means the only possible implementation of the present invention, and that many variations are possible.

In one embodiment, the user can turn on or off the additional information by, for example, hitting a key on a keyboard. This functionality can be temporary (to toggle it on or off for the current location of the cursor), or global (to turn the feature on or off globally).

In an embodiment where a hardware cursor is used, the additional information can be pushed to a memory location associated with the hardware cursor, so that the techniques of the present invention can operate as described above.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
   moving a cursor on a display of a computing device in response to a first user input to the computing device; and
   while the cursor is positioned at a first location to point to a user-activatable element referencing a link that corresponds to content:
      presenting, alongside the cursor, a user interface element including a preview of the content at a first size;
      while displaying the user interface element alongside the cursor, detecting a press input with an input mechanism; and
      responsive to receiving the press input, displaying additional information in the preview of the content, the additional information being displayed only as long as the press input is held down.

2. The method of claim 1, further comprising, prior to presenting the preview of the content, obtaining the content.

3. The method of claim 1, further comprising, prior to presenting the preview of the content, pre-fetching a plurality of content corresponding to a plurality of links.

4. The method of claim 3, wherein pre-fetching the plurality of content comprises storing the information in a local cache.

5. The method of claim 1, further comprising, responsive to the cursor being positioned to no longer point to the user-activatable element, ceasing the presentation of the preview.

6. The method of claim 1, further comprising:
   determining that a thumbnail representation of at least a portion of the preview is not available; and wherein
   responsive to the thumbnail representation not being available, the preview excludes the thumbnail representation.

7. The method of claim 1, wherein the preview comprises a representation of a plurality of applications capable of opening the link; and wherein the method further comprises:
   receiving a second user input selecting the representation of an application of the plurality of applications; and
   responsive to the second user input, opening the link using the selected application.

8. The method of claim 1, wherein the presenting of the preview is performed responsive to the cursor being positioned to point to the user-activatable element for at least a predetermined period of time.

9. The method of claim 1, further comprising automatically scrolling the preview alongside the cursor.

10. The method of claim 1, further comprising, responsive to receiving a second user input requesting scrolling, scrolling the preview alongside the cursor.

11. The method of claim 1, further comprising, prior to presenting the preview:
   obtaining the content; and
   scaling the content to fit within the user interface element.

12. A method comprising:
   displaying a web page comprising a plurality of links;
   moving a cursor in response to a first user input;
   responsive to the cursor being positioned at a first location to point to a link referencing a target:
      determining that a thumbnail representation of at least a portion of the target is not available;
      presenting, alongside the cursor, information about the target comprising meta-data associated with the target and an excerpt of contents of the target, wherein responsive to determining that the thumbnail representation is not available, the information excludes the thumbnail representation; and
      responsive to receiving a press input requesting additional information, presenting additional information about the target, the additional information being presented only as long as the press input is held down.

13. A method comprising:
   displaying a plurality of graphical user interface elements, each graphical user interface element referencing a corresponding link, each link having corresponding content;
   receiving a first user input to position a cursor;
   displaying the cursor at a first location specified by the received first user input; and responsive to the cursor being positioned at a second location to point to one of the graphical user interface elements:
presenting, alongside the cursor, a user interface element including a preview of the content corresponding to the link corresponding to the graphical user interface element at a first size;
while displaying the user interface element alongside the cursor, detecting a press input with an input mechanism; and
responsive to receiving the press input, displaying additional information in the preview of the content, the additional information being displayed only as long as the press input is held down.

14. The method of claim 13, further comprising:
pre-fetching the content corresponding to the plurality of graphical user interface elements.

15. A computer system, comprising:
an input device configured to receive a first user input to position a cursor; and
a processor coupled to a display device configured to:
display a plurality of graphical user interface elements, each graphical user interface element referencing a corresponding link, each link having corresponding content;
display the cursor at a position specified by the first user input;
responsive to the cursor being positioned at a first location to point to one of the graphical user interface elements:
present, alongside the cursor, a user interface element including a preview of the content corresponding to the link corresponding to the graphical user interface element at a first size;
while displaying the user interface element alongside the cursor, detect a press input with an input mechanism; and
responsive to receiving the press input, displaying additional information in the preview of the content, the additional information being displayed only as long as the press input is held down.

16. The computer system of claim 15, wherein, responsive to the cursor being positioned to no longer point to the graphical user interface element, the display device ceases to display the content.

17. The computer system of claim 15, wherein:
the preview further comprises a representation of a plurality of applications capable of opening the link;
the input device is further configured to receive user input selecting the representation of an application of the plurality of applications; and
the processor is further configured to open the link using the selected application.

18. The computer system of claim 15, wherein the display device presents the user interface element including the preview responsive to the cursor being positioned to point to the graphical user interface element for at least a predetermined period of time.

19. A computer program product comprising:
a non-transitory computer-readable storage medium; and
computer program code, encoded on the medium, for operations comprising, in a user interface:
moving a cursor on a display of a computer in response to a first user input to the computer;
responsive to the cursor being positioned at a first location to point to a user-activatable element referencing a target:
determining that a thumbnail representation of at least a portion of the target is not available;
presenting, alongside the cursor, first information about the target comprising an excerpt of contents of the target, wherein responsive to determining that the thumbnail representation is not available, the first information excludes the thumbnail representation; and
responsive to receiving a press input requesting additional information, presenting, alongside the cursor, the first information and the additional information about the target, the additional information being presented only as long as the press input is held down.

20. The computer program product of claim 19, further comprising computer program code for, prior to presenting the first information about the target, obtaining the first information about the target.

21. The computer program product of claim 19, further comprising computer program code for, prior to presenting the first information about the target, pre-fetching information about a plurality of targets.

22. The computer program product of claim 21, wherein the computer program code for pre-fetching information about a plurality of targets comprises computer program code for storing the information in a local cache.

23. The computer program product of claim 19, wherein the computer program code for presenting the first information about the target comprises computer program code for displaying the first information within the cursor.

24. The computer program product of claim 19, further comprising computer program code for, responsive to the cursor being positioned to no longer point to the user-activatable element, ceasing the presentation of the first information.

25. The computer program product of claim 14, wherein:
the user-activatable element comprises a link; and
the target comprises a web page.

26. The computer program product of claim 19, wherein the first information about the target further comprises at least one selected from the group consisting of:
a thumbnail representation of at least a portion of the target;
an excerpt of text from the target;
meta-data about the target;
a summary of the target;
a description of the target;
an animation;
an icon; and
a hypertext link.

27. The computer program product of claim 19, wherein the first information about the target further comprises a representation of at least one application capable of opening the target; and further comprising computer program code for:
receiving a second user input selecting the at least one application; and
responsive to the second user input, opening the target using the selected application.

28. The computer program product of claim 19, wherein the computer program code for presenting the first information about the target operates responsive to the cursor being positioned to point to the user-activatable element for at least a predetermined period of time.

29. The computer program product of claim 19, further comprising computer program code for scrolling the first information alongside the cursor.

30. The computer program product of claim 19, further comprising computer program code for, responsive to receiving a third user input requesting scrolling, scrolling the first information alongside the cursor.

31. The computer program product of claim 19, further comprising computer program code for, prior to presenting the first information:
 obtaining the first information about the target; and
 scaling the first information to fit alongside the cursor.

32. The computer program product of claim 19, wherein the target comprises one selected from the group consisting of:
 a document;
 a web page;
 an image;
 a file; and
 an application.

* * * * *